3,100,134
DYEING AND PRINTING OF ARTICLES OF
LINEAR POLYAMIDES
Karl Maier and Hans Juergen Nienburg, Ludwigshafen (Rhine), Germany, assignors to Badische Anilin- & Soda-Fabrik Aktiengesellschaft, Ludwigshafen (Rhine), Germany
No Drawing. Filed Mar. 27, 1961, Ser. No. 98,294
Claims priority, application Germany Apr. 5, 1960
10 Claims. (Cl. 8—55)

This invention relates to a novel process for dyeing and printing articles of linear polyamides with aminoanthraquinone dyes, and to articles of linear polyamides which have been dyed with such dyes.

It is known to use 1-amino-4-butylaminoanthraquinone-2-sulfonic acid and 1-amino-4-benzylaminoanthraquinone-2-sulfonic acid for dyeing wool. However, when attempts are made to apply these dyes to articles of linear polyamides, the dyeings or prints obtained have completely inadequate fastness to wet treatment. The homologous 1-amino-4-alkylaminoanthraquinone-2-sulfonic acids whose alkylamino group contains more than 12 carbon atoms, which have already been used for dyeing nitrocellulose lacquers, on polyamides likewise show completely inadequate fastness to wet treatment. Moreover, they have unsatisfactory affinity.

It is an object of the present invention to provide an improved process for dyeing and printing articles of linear polyamides in blue shades of outstanding fastness to wet treatment.

A further object of the invention is to provide an improved process for dyeing and printing articles of linear polyamides in blue shades of outstanding brilliance.

It is another object of the invention to provide articles of linear polyamides, such as films, sheets, filaments, threads, woven and non-woven fabrics, knitted fabrics and felts, which have been dyed or printed in blue shades of outstanding brilliance and outstanding fastness to wet treatment.

The said objects are accomplished by using for the dyeing and printing of articles of linear polyamides, dyes which contain the anion of the formula:

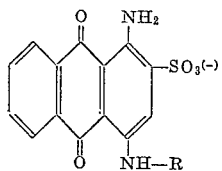

in which R represents an alkyl radical containing from 7 to 12 carbon atoms.

Suitable cations which are combined with the anions of the above formula include: protons (in which case the dyes are present as free sulfonic acids); inorganic cations, for example the ammonium ion and especially the cations of the alkali metals, preferably of sodium and potassium; organic cations, for example those of aliphatic, cycloaliphatic, aromatic or heterocyclic amines whose carbon skeleton may bear additional substituents, such as diethylamine, triethanolamine, cyclohexylamine, p,p'-diaminodicyclohexylmethane, aniline and piperidine, and the cations of quaternary ammonium compounds derived from such amines. The salts formed from these cations and the above-mentioned dye anions will, for the sake of brevity, hereinafter be referred to as "alkali metal, amine and ammonium salts."

The alkyl radical R as specified above should be saturated, i.e. should not contain double bonds, and should preferably contain 8 or 9 carbon atoms. It is of special industrial interest to dye and print articles of linear polyamides with those dyes of the above formula in which the radical R has one or more branchings.

Dyes which are used for dyeing and printing in accordance with the present invention include 1-amino-4-n-heptylamino-, -4-n-decylamino- and -4-laurylaminoanthraquinone-2-sulfonic acid and the alkali metal, amine and ammonium salts thereof. Preferred dyes are 1-amino-4-octylamino- and 1-amino-4-nonylaminoanthraquinone-2-sulfonic acid and their alkali metal, amine and ammonium salts, the dyes containing a branched alkyl group being of special industrial importance. Dyes of this kind include 1-amino-4-(2-ethylhexyl)-aminoanthraquinone-2-sulfonic acid, 1-amino-4-nonylaminoanthraquinone-2-sulfonic acid whose branched nonylamino radical has been obtained from diisobutylene by hydrogenating reaction with carbon monoxide and conversion of the hydroxyl group formed into an amino group, and the alkali metal, amine and ammonium salts of these sulfonic acids.

The dyes can be prepared by known processes, for example by reacting primary alkylamines containing from 7 to 12 carbon atoms with 1-amino-4-haloanthraquinone-2-sulfonic acids, such as 1-amino-4-chloro- or, preferably, -4-bromoanthraquinone-2-sulfonic acid as such or in the form of the alkali metal salts. The reaction is conducted in the presence of reagents which bind hydrogen halides, such as sodium or potassium carbonate, sodium bicarbonate, sodium acetate or secondary sodium phosphate, and in the presence of copper salts, such as copper sulfate, cuprous chloride or copper acetate, or of copper powder, in aqueous, aqueous-alcoholic or alcoholic liquid, if desired in the presence of dispersing agents, such as the sodium salt of the condensation product of β-naphthalenesulfonic acid and formaldehyde. Low molecular weight alcohols, such as methanol, ethanol and glycol, are especially suitable as solvents or diluents for the purposes of this reaction.

The reaction proceeds at moderately elevated temperatures of from 60° to 100° C., advantageously at 70° to 90° C., and is as a rule complete after 3 to 14 hours. If 1-amino-4-bromoanthraquinone-2-sulfonic acid or its water-soluble salts are employed, 3 to 8 hours are usually sufficient. The reactants may be used in stoichiometric amounts, but it is advantageous to employ 1.2 to 2 moles of amine per mole of 1-amino-4-haloanthraquinone-2-sulfonic acid. A larger excess of amine has no disadvantageous effect.

According to another process, 1-amino-2,4-dihaloanthraquinones, such as 1-amino-2,4-dichloroanthraquinone or, preferably, 1-amino-2,4-dibromoanthraquinone, are reacted with primary alkylamines containing from 7 to 12 carbon atoms. The alkylamines are preferably used in excess, thus at the same time serving as solvents and/or diluents. As a rule, 4 to 8 moles of amine per mole of 1-amino-2,4-dihaloanthraquinone are sufficient. It is of advantage to conduct the reaction in the presence of acid-binding reagents, such as sodium or potassium acetate, and, if desired, also in the presence of copper salts, such as basic copper acetate, and at elevated temperatures, preferably at 160° to 200° C. As a rule, the reaction is complete after a period of 30 minutes to 4 hours. The resultant 1-amino-2-halo-4-alkylaminoanthraquinones are separated from the reaction mixture by usual methods, advantageously by adding a diluent, for example methanol or ethanol.

In the said compounds, the halogen which is present in the 2-position at the anthraquinone ring is replaced by a sulfonic acid group, advantageously by the action of water-soluble salts of sulfurous acid, such as sodium or potassium sulfite, or aqueous solutions of sulfurous acid, together with acid-binding reagents such as pyridine or methylamine, on the said 2-haloanthraquinone compounds. The replacement of the halogen by a sulfonic acid group is advantageously carried out in aqueous-organic liquid. Suitable liquids of this kind include mixtures of water and one or more water-miscible solvents, for example alcohols, such as ethanol and isopropanol, phenol, dioxan, pyridine, N-methylpyrrolidone and N,N-dimethylformamide. The reaction is conducted at elevated temperatures of from 90° to 160° C., advantageously at 100° to 140° C., and is as a rule complete after 6 to 12 hours. The dyes formed are then isolated in conventional manner.

In working by the new process according to this invention, the dyes specified above are applied to the material by the methods usual in the dyeing and printing of articles of linear polyamides, i.e. in the form of aqueous solutions or dispersions whose viscosity may, if required, be increased to paste-like consistency by the addition of thickeners.

When dyeing by the new process, the said solutions or dispersions are employed without the addition of thickeners or with the addition of only small amounts (up to 50 g./liter) thereof, i.e. dyebaths of low to medium viscosity are used. Suitable thickeners include natural and synthetic substances which can be colloidally dissolved in water bringing about an increase in viscosity, such as British gum, tragacanth, crystal gum, alginates, carboxymethyl cellulose and polyvinyl alcohol. The amount of dyes of the above-mentioned kind used for the preparation of the dyebaths depends on the desired depth of shade. As a rule, amounts of 0.05 to 8%, preferably of 1 to 2%, with reference to the weight of the material to be dyed are employed.

In addition, there may be incorporated into the dyebaths conventional anionic or non-ionic surface-active agents, for example polyoxyalkylene derivatives of long-chain fatty alcohols, fatty amines, fatty acid amides and fatty acids, such as the product obtained by reaction of 1 mole of octadecyl alcohol with 25 moles of ethylene oxide or the sodium salt of the acid sulfuric acid ester of the addition compound from about 80 moles of ethylene oxide and 1 mole of sperm oil alcohol, or alkyl sulfonates, alkyl sulfates and water-soluble salts of dialkyl disulfonimides having long-chain alkyl groups. By "long-chain alkyl groups" we mean alkyl groups which contain at least 6 carbon atoms and which may also contain chain branchings. The said surface-active agents may be added to the dyebaths in amounts of from about 0.5 to 2 g./liter.

It is of special industrial interest to coemploy dispersing agents which ensure uniform and fine distribution of the dye in the dyebath. Suitable dispersing agents include the water-soluble salts of ligninsulfonic acids and the condensation product from naphthalene-2-sulfonic acid and formaldehyde. The dispersing agents are used in amounts of up to 150% with reference to the weight of the dye.

In the dyebaths a pH of between about 3 and 10 is set up by adding alkaline-reacting substances, for example ammonia or sodium carbonate, or acid-reacting substances, for example weak organic acids such as acetic acid, and formic acid, or salts which dissolve giving an acid reaction, as for example ammonium sulfate. The dyebaths are allowed to act on the material to be dyed at temperatures of between 60° and 120° C., preferably between 90° and 100° C. It has proved particularly useful to employ weakly alkaline dyebaths and to add thereto, in the course of the dyeing process, acid-reacting substances so that the dyebaths are weakly acid during the final phase of the dyeing process. Dyeing may be carried out in conventional dyeing apparatus, for example in hank or cheese dyeing machines, beam dyeing machines, package dyeing machines, winch vats, on jigs or padding machines. If it is desired to dye at temperatures of above 100° C. up to 120° C., dyeing apparatus which can be closed pressure-proof must be used. The liquor ratio depends in known manner on the kind of dyeing apparatus used. As a rule, it is between 3:1 and 100:1. The dyeing process may take from 30 minutes to 4 hours. In most cases, it is complete after 1 to 2 hours. The optimum dyeing time is readily determined by test-dyeing a specimen of the material to be dyed.

If dyeing is carried out on a padding machine, the dye which after the padding operation adheres only loosely to the material, must be fixed on the material by subsequent treatment with heated steam. The optimum steaming time depends on the steam temperature and is readily ascertained by preliminary experiment.

The dyed goods are rinsed with water in conventional manner and may be slightly soaped, if desired.

Printing with the above dyes is likewise carried out in conventional manner. For application by printing, the aqueous solutions or dispersions of the dyes must be used in the form of pastes. The desired consistency of the printing pastes is achieved by adding larger amounts of thickeners of the kind specified above than are usually added to dyebaths. The thickener content may be about 10 to 30% with reference to the total weight of the pastes; in the case of low-body thickeners, such as alginates, the content may also be less than 10%. The dye content of the pastes is from 0.2 to 8%, preferably from 1 to 4%, with reference to the total weight of the pastes. Dispersing agents of the kind and in the amounts specified in the description of the dyebaths may also be incorporated into the printing pastes.

The printing pastes may, furthermore, contain conventional auxiliaries, for example organic solvents, such as pyridine and thiodiglycol; swelling agents, such as phenol and polyglycols; hydrotropic substances, such as urea; humectants, such as glycerol and glycol; foam suppressers, such as triaryl phosphates; and buffers by means of which a certain pH can be imparted to the pastes. As a rule, the printing pastes are adjusted about neutral.

The printing pastes are applied to the material by means of conventional printing apparatus, such as roller or screen printing machines. The printed material is treated, if desired after intermediate drying, with saturated steam for 2 to 30 minutes, and rinsed and dried in conventional manner. The printed material may be soaped prior to drying.

On articles of linear polyamides, the new dyeing and printing process affords dyeings and prints in highly brilliant, full reddish-blue shades with very good fastness properties.

By "linear polyamides" within the scope of the present invention we understand water-insoluble high molecular weight condensation products of dicarboxylic acids and diamines and/or aminocarboxylic acids, which contain the grouping —CO—NH— as a recurring unit in the chain and which have an unbranched or slightly branched molecular structure. Their molecular weights lie above 10,000. Dicarboxylic acids and diamines suitable as starting materials for condensation to linear polyamides include, above all, the aliphatic compounds, especially those having 4 or more carbon atoms in the molecule, such as succinic acid, glutaric acid, adipic acid, pimelic acid and suberic acid, and butylenediamine, pentamethylenediamine and hexamethylenediamine. Linear polyamides based on aminocarboxylic acids include those which are prepared from γ-aminobutyric acid, δ-aminovaleric acid or ε-aminocaproic acid or from the corresponding lactams, such as ε-caprolactam or caprylic lactam, or from ω-aminoundecylic acid. Linear polyamides falling within the scope of the present invention also include condensation products from mixtures of different dicarboxylic acids and diamines and from mixtures of dicarboxylic acids, diamines and aminocarboxylic acids or lactams thereof.

The following examples will further illustrate our invention, but the invention is not limited to the examples. The parts and percentages specified in the examples are by weight.

Example 1

A dyebath is prepared which contains, in 3,000 parts of aqueous mixture, 1 part of finely dispersed 1-amino-4-(2-ethylhexyl)-aminoanthraquinone-2-sulfonic acid of the formula:

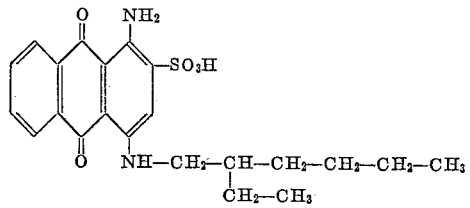

1 part of the reaction product from naphthalene-2-sulfonic acid and formaldehyde, 2 parts of the sodium salt of the acid sulfuric acid ester of the reaction product from 1 mole of sperm oil alcohol and 80 moles of ethylene oxide, and 2 parts of ammonia (30%).

100 parts of knitted polycaprolactam fabric is placed into the bath at boiling temperature. The bath is allowed to act on the material for 1 hour at this temperature. Then 4 parts of ammonium sulfate is added, and the material is treated for another 30 minutes at boiling temperature. The fabric is then rinsed and dried. A deep reddish-blue dyeing of good fastness to light, water, perspiration and washing is obtained.

Example 2

A dyebath is prepared from 2,000 parts of water, 0.5 part of a finely divided dye obtained from 1-amino-4-bromoanthraquinone-2-sulfonic acid and technical-grade nonylamine (averaging two $CH_3$ branchings) and having the formula:

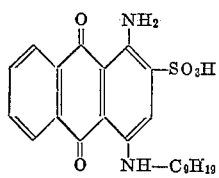

1.5 parts of the sodium salt of the acid sulfuric acid ester of the reaction product from 1 mole of sperm oil alcohol and 80 moles of ethylene oxide, and 4 parts of acetic acid (30%). 100 parts of polyhexamethylene adipamide fiber is dyed in this bath for 1½ hours at boiling temperature, and rinsed.

A reddish-blue dyeing is obtained which has good fastness to light and very good fastness to wet treatment.

Example 3

A printing paste is prepared from 30 parts of a dye obtained from 1-amino-4-bromoanthraquinone-2-sulfonic acid and 2-ethylhexylamine and having the formula:

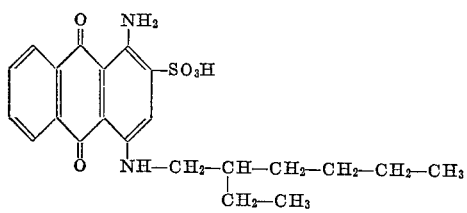

30 parts of thiodiglycol, 500 parts of crystal gum dissolved in water in a ratio of 1:2, 30 parts of phenol and 410 parts of water. A fabric of a polyamide prepared by polycondensation from ω-aminoundecylic acid is printed with the said paste, dried, and steamed for 30 minutes. It is then rinsed, and soaped for 10 minutes at 50° C. with a solution of 0.5 part of Marseilles soap in 1,000 parts of water.

A brilliant reddish-blue dyeing is obtained which has good fastness to light, water and washing.

Example 4

A dyebath is prepared which contains, in 3,000 parts of aqueous mixture, 1 part of the sodium salt of 1-amino-4-n-hexylaminoanthraquinone-2-sulfonic acid, 1 part of the reaction product from naphthalene-2-sulfonic acid and formaldehyde, 2 parts of the sodium salt of the acid sulfuric acid ester of the reaction product from 1 mole of sperm oil alcohol and 80 moles of ethylene oxide, and 2 parts of ammonia (30%).

100 parts of a fabric from the polyamide of ω-aminoundecanoic acid is placed into the bath at boiling temperature. The bath is allowed to act on the material for 1 hour at this temperature. Then 4 parts of ammonium sulfate is added, and the material is treated for another 30 minutes at boiling temperature. The fabric is then rinsed and dried. A full, brilliant reddish-blue dyeing of good fastness to light and wet treatment is obtained.

Dyeings with similar characteristics are obtained by replacing the sodium salt of 1-amino-4-n-hexylaminoanthraquinone-2-sulfonic acid contained in the dyebath described in the first paragraph of the present example, by the same amount of 1-amino-4-n-octylaminoanthraquinone-2-sulfonic acid, 1-amino-4-n-decylaminoanthraquinone-2-sulfonic acid or 1-amino-4-n-dodecylaminoanthraquinone-2-sulfonic acid or of the alkali metal salts of these acids.

We claim:

1. A process for dyeing and printing articles of linear polyamides which comprises applying to said linear polyamide the dyestuff anion of the formula:

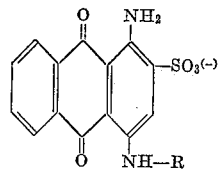

in which R represents an alkyl radical containing from 7 to 12 carbon atoms.

2. A process for dyeing and printing articles of linear polyamides which comprises applying to said linear polyamide the dyestuff anion of the formula:

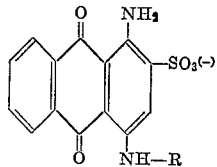

in which R represents a branched alkyl radical containing from 7 to 12 carbon atoms.

3. A process for dyeing and printing articles of linear polyamides which comprises applying to said linear polyamide the dyestuff anion of the formula:

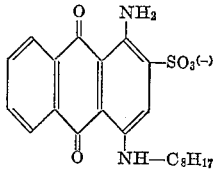

4. A process for dyeing and printing articles of linear polyamides which comprises applying to said linear polyamide the dyestuff anion of the formula:

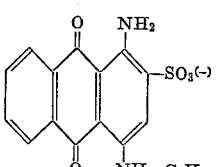

5. A process for dyeing and printing articles of linear polyamides which comprises applying to said linear polyamide the dyestuff anion of the formula:

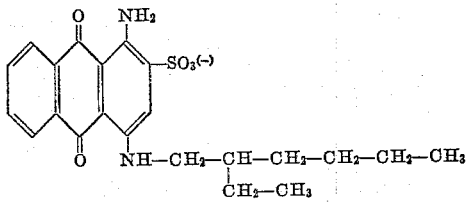

6. Articles of linear polyamides which have been dyed by the dyestuff anion of the formula:

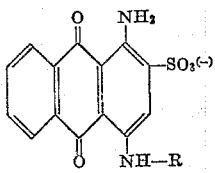

in which R represents an alkyl radical containing from 7 to 12 carbon atoms.

7. Articles of linear polyamides which have been dyed by the dyestuff anion of the formula:

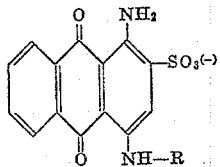

in which R represents a branched alkyl radical containing from 7 to 12 carbon atoms.

8. Articles of linear polyamides which have been dyed by the dyestuff anion of the formula:

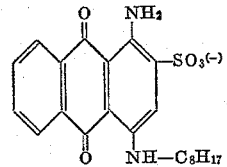

9. Articles of linear polyamides which have been dyed by the dyestuff anion of the formula:

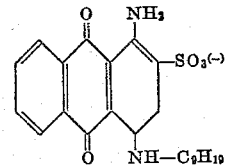

10. Articles of linear polyamides which have been dyed by the dyestuff anion of the formula:

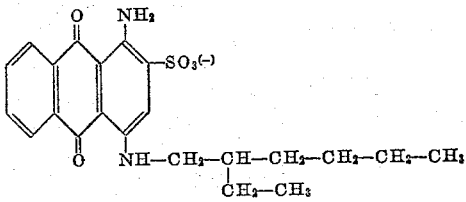

References Cited in the file of this patent
UNITED STATES PATENTS

| | | |
|---|---|---|
| 1,587,669 | Muller | June 8, 1926 |
| 2,235,208 | Ellis et al. | Mar. 18, 1941 |
| 2,918,344 | Jenny | Dec. 22, 1959 |